United States Patent
Da-Silva-Valente et al.

(10) Patent No.: US 7,336,718 B2
(45) Date of Patent: Feb. 26, 2008

(54) DECODING OF LOW-COMPLEXITY SIGNALS TRANSMITTED BY A CONSTELLATION MODULATION

(75) Inventors: Helder Da-Silva-Valente, Grenoble (FR); Frederic Lehmann, San Diego, CA (US)

(73) Assignee: STMicroelectronics SA, Montrouge (FR)

( * ) Notice: Subject to any disclaimer, the term of this patent is extended or adjusted under 35 U.S.C. 154(b) by 734 days.

(21) Appl. No.: 10/735,251

(22) Filed: Dec. 12, 2003

(65) Prior Publication Data

US 2004/0141564 A1    Jul. 22, 2004

(30) Foreign Application Priority Data

Dec. 13, 2002   (FR)   .................................. 02 15834

(51) Int. Cl.
*H04L 23/02*   (2006.01)
*H03M 13/03*   (2006.01)
(52) U.S. Cl. ...................... 375/261; 714/794
(58) Field of Classification Search .............. 375/261, 375/259, 260, 268, 320, 341; 714/794, 795
See application file for complete search history.

(56) References Cited

U.S. PATENT DOCUMENTS

2002/0131515 A1   9/2002   Rodriguez
2003/0185320 A1*  10/2003  Ueno et al. ................. 375/347

FOREIGN PATENT DOCUMENTS

EP    1195908 A2    4/2002
EP    1246419 A1   10/2002
EP    1294152 A2    3/2003

\* cited by examiner

*Primary Examiner*—Khai Tran
(74) *Attorney, Agent, or Firm*—Graybeal Jackson Haley LLP

(57) ABSTRACT

A method decodes a noisy signal from the coordinates of a point in a point constellation, each point associated with a digital data item of a determined number of bits, consisting of determining components of a received point; determining a reference point corresponding to the constellation point closest to the received point; determining at least one concurrent point corresponding to the constellation point closest to the reference point, having a bit of determined rank opposite to the bit of determined rank of the reference data; and determining, at least for the bit of the reference digital data at said determined rank, a precision data item based the received, reference, and concurrent points, in which the determination of the bits of the concurrent point is performed based on the values of some of the bits of the reference digital data and on said rank.

20 Claims, 2 Drawing Sheets bit₀ bit₁ bit₂ bit₃ bit₄ bit₅

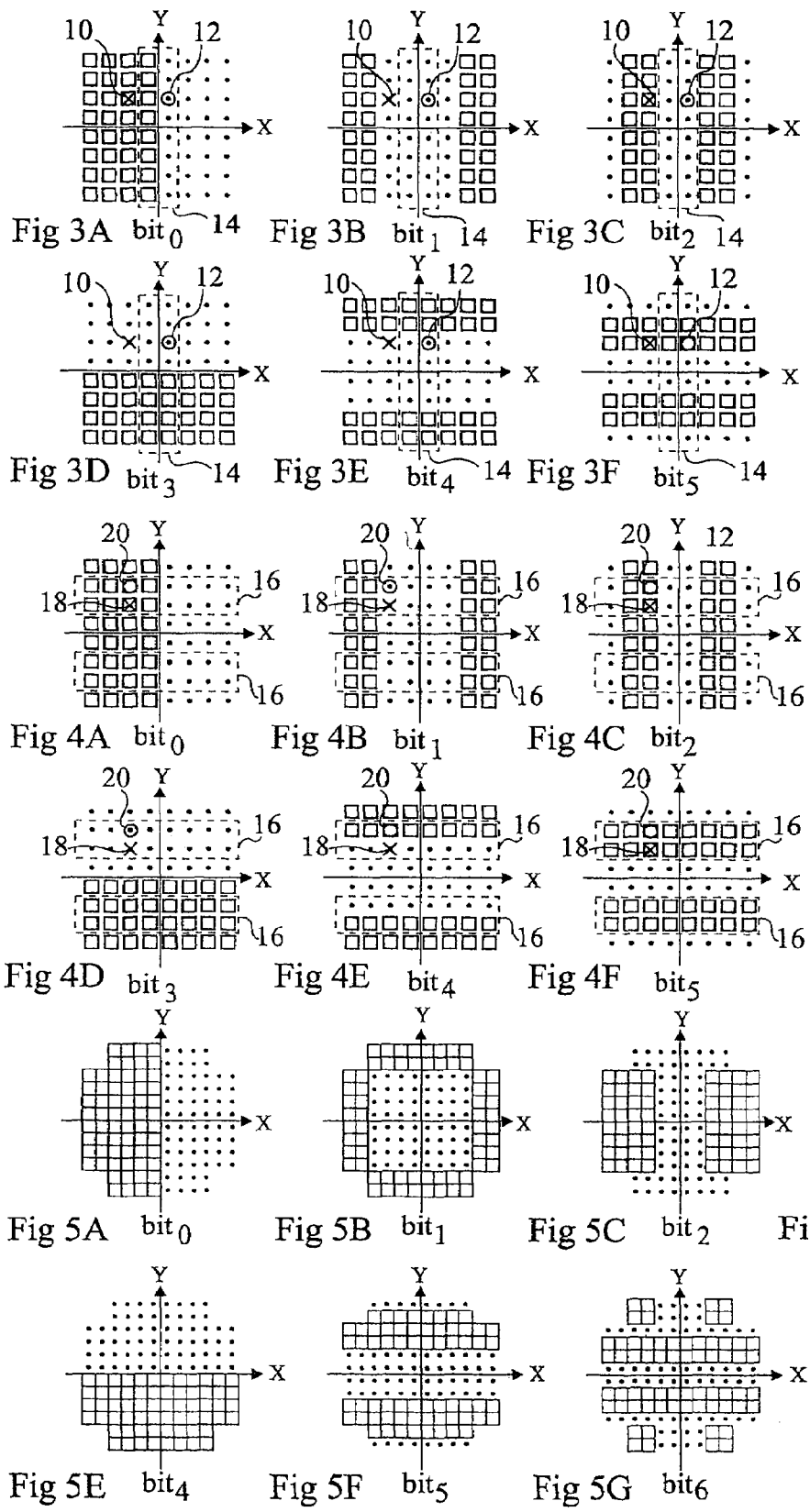

DECODING OF LOW-COMPLEXITY SIGNALS TRANSMITTED BY A CONSTELLATION MODULATION

PRIORITY CLAIM

This application claims priority from French patent application No. 02/15834, filed Dec. 13, 2002, which is incorporated herein by reference.

BACKGROUND

1. Technical Field

The present invention relates to a method and a device for decoding signals transmitted according to a modulation implementing a constellation.

2. Discussion of the Related Art

An example of a modulation implementing a constellation is the quadrature amplitude modulation, which consists of simultaneously transmitting two amplitude-modulated components having a 90-degree phase shift. A modulated signal Sn, transmitted for a duration T, thus has the following form:

$$S(t)=a*\sin(2\pi ft)+b*\cos(2\pi ft) \quad (1)$$

where amplitudes a, b, constant during transmission time T, are selected from among couples of possible values. Each pair (a, b) may be represented in a Cartesian referential by a point P, having its abscissa I, or in-phase component, corresponding to data a, and its ordinate Q, or quadrature component, corresponding to data b. The expression "constellation" corresponds to the representation of all the possible points P for transmission in an orthonormal referential. According to the coding method used, the number of possible couples (a, b), or number of states nstates, varies. Each point P may be associated with a digital data item containing a number of bits nbits which depends on the allowed number of states nstates according to the following relation:

$$n\text{bits}=\text{Int}(\log 2(n\text{states})) \quad (2)$$

where Int is the whole portion function.

As an example, when nstates is equal to 64, the modulation is called the QAM 64 modulation and nbits is equal to 6. The maximum amplitudes of components I and Q being necessarily bounded, the number of bits nbits of the digital data associated with points P depends on the minimum acceptable distance separating points P of the constellation from one another. In practice, the larger the minimum distance, the more robust the coding process is against noise. The number of bits nbits that can be associated with a QAM symbol thus then essentially depends on the noise level present on the communication channel used for the transmission of signals s.

To each point in the constellation is assigned a label varying from 0 to nstates-1, which corresponds to digital data with nbits bits. Such an operation is called the labeling. The function enabling transforming a digital data item with nbits bits into components I and Q of the associated constellation point is called the mapping function. The choice of the mapping function enables increasing the spectral efficiency, that is, the number of bits transmitted per time unit and per frequency band. A received signal s' corresponds to a transmitted signal s disturbed by the noise present on the communication channel used for the signal transmission.

The decoding method consists, from the received signal s', of determining two components Irec and Qrec to place a received point Prec on the representation of the constellation. Due to the noise present on the communication channel, point Prec generally does not exactly correspond to the transmitted constellation point.

A general step of the decoding process called the hard demapping then consists of determining, based on the received point Prec, which is the constellation point, or reference point Pref, corresponding to the transmitted signal with the greatest probability. Such a step consists of determining the constellation point which is closest to received point Prec according to the Euclidian distance. The digital data associated with the reference point is called the reference data.

The sole previous step of the decoding does not enable associating with reference point Pref information relative to the interference which may have affected received signal s'. This is why current decoding methods generally comprise an additional step, called a soft demapping, which consists, for example, of providing for each received signal s' a decoding data item corresponding to a sequence of signed values, for example of the type (−5; −1.2; 9.2; −0.2). The sign + or − of a signed value at a determined rank in the signed value sequence represents value 0 or 1 of the bit of same rank of the reference data. Each absolute value of a signed value at a determined rank represents information relative to the interference which may have affected the received signal for the bit of same rank of the reference data. The signed values are also called soft bits. Soft bits bring more information than the mere reference data resulting from the hard demapping step. Many decoding methods use the soft bits as an input. It may be iterative processes of turbocode (convolutional and product), soft-Viterbi, low-density parity code type. Such processes are also called soft input soft output or SISO processes.

The determination of a decoding data item thus requires calculation of a signed value for each bit of the reference data. Such a calculation assumes that the communication channel noise is known and can, for example, be modeled by an additive white Gaussian noise (AWGN). The signed value associated with the bit of rank j, called bitj, of the reference data is obtained by ratio LLRj, called Log Likelyhood Ratio, which is expressed as follows:

$$LLR_j = \ln\frac{P_1(bit_j = 1/s')}{P_0(bit_j = 0/s')} \quad (2)$$

where P1(bitj=1/s') corresponds to the probability for bit bitj of the digital data associated with received signal s' to be equal to 1, given the received signal s', and P0(bitj=0/s') corresponds to the probability for bit bitj of the digital data associated with the received signal s'to be equal to 0, given the received signal s'. Theoretically, the calculations of probabilities P1, P0 must be performed for all constellation points. However, to reduce the calculation time and reduce the complexity of the circuit implementing the calculation (for example, an integrated circuit), a good approximation of ratio LLRj may be obtained by using only two points of the constellation, more specifically the points which bring the greatest contributions to probabilities P1 and P0. For each considered bit of rank j, the constellation point closest to the received point Prec and for which the bit of rank j of the digital data has a value opposite to the bit of same rank of the reference data is called the concurrent point $P_{conc}^j$. Calling $\sigma^2$ the variance of the Gaussian noise of the communication channel, considering that probabilities P1 and P0 each follow a normal distribution, ratio LLRj may be expressed as follows:

$$|LLR_j| = \frac{\|P_{rec} - P_{conc}^j\|^2 - \|P_{rec} - P_{ref}\|^2}{2\sigma^2} \quad (3)$$

$$= \frac{\left[(I_{rec} - I_{conc}^j)^2 + (Q_{rec} - Q_{conc}^j)^2\right] - \left[(I_{rec} - I_{ref})^2 + (Q_{rec} - Q_{ref})^2\right]}{2\sigma^2}$$

$$\text{sign}(LLR_j) = 2P_{ref}^j - 1 \quad (4)$$

where sign is a function equal to +1 when ratio LLRj is positive and equal to −1 when ratio LLRj is negative, Irec, Iref, and $I_{conc}^j$ are the components I respectively of points Prec, Pref, and $P_{conc}^j$, and Qrec, Qref, and $Q_{conc}^j$ are the components $Q_{conc}^j$ of points Prec, Pref, and $P_{conc}^j$, and $P_{ref}^j$ is the value of the bit of rank j of point Pref.

The determining of concurrent point $P_{conc}^j$ for a bit bitj is generally obtained by calculating the distance separating received point Prec from each possible concurrent point $P_{conc}^j$ for which the bit of rank j of the digital data associated with concurrent point $P_{conc}^j$ has a value opposite to the bit of rank j of the reference data, and by choosing the point for which the calculated distance is minimum.

For a given reference point Pref, generally nstates-1 distances are calculated. The determination of the sequence of signed values of the decoding data thus requires a significant calculation time which may have an adverse effect, especially when the decoding process is performed in real time. Further, like for the step of determination of reference point Pref, the steps of determination of concurrent points $P_{conc}^j$ require for coordinates I and Q of all constellation points to be memorized and accessible.

SUMMARY

One aspect of the present invention aims at obtaining a method for decoding signals transmitted according to a quadrature amplitude modulation for which the determination of the concurrent points can be implemented with a short calculation time and a low complexity of the circuit determining the concurrent points.

Another aspect of the present invention also aims at reducing the amount of data to be stored for the determination of concurrent points.

According to one aspect of the present invention, a method provides for decoding a noisy signal provided from the coordinates of a point in a point constellation, each constellation point being associated with a digital data item of a determined number of bits, the method determining, based on the noisy signal, components of a received point; determining a reference point associated with a digital reference data item and corresponding to the constellation point closest to the received point; determining at least one concurrent point corresponding to the constellation point closest to the reference point associated with a digital data item, having a bit of determined rank with a logic value opposite to the bit of determined rank of the reference data; and determining, at least for the bit of the reference digital data at said determined rank, a precision data item based on the received point, the reference point, and the concurrent point, in which the determination of the bits of the digital data associated with the concurrent point is performed based on the values of some of the bits of the reference digital data and on said rank.

According to an embodiment of the present invention, the constellation points for which the bits of the digital data associated with the determined rank have a determined logic value are distributed in at least one set of juxtaposed points symmetrical with respect to the axis or the other one of two reference axes (X, Y) of the constellation.

According to an embodiment of the present invention, for successive ranks, the constellation points for which the bits of the digital data associated with said successive ranks have a determined logic value are distributed in at least one set of juxtaposed points symmetrical with respect to a same reference axis (X, Y) of the constellation.

According to an embodiment of the present invention, the constellation is a Gray constellation.

According to an embodiment of the present invention, the constellation is a quasi-Gray constellation.

According to an embodiment of the present invention, the noisy signal is provided by a quadrature amplitude modulation.

According to a further aspect of the present invention, a decoding device comprises a means for receiving a noisy signal provided from the coordinates of a point of a point constellation, each point in the constellation being associated with a digital data item of a determined number of bits; a means for determining based on the noisy signal components of a received point; a means for determining a reference point associated with a reference digital data item and corresponding to the constellation point closest to the received point; a means for determining at least one concurrent point corresponding to the constellation point closest to the reference point associated with a digital data item, having a bit at a determined rank with a logic value opposite to the bit at the same determined rank of the reference data; and a means for determining, at least for the bit of the reference digital data at the determined rank, a precision data item based on the received point, on the reference point, and on the concurrent point, in which the means for determining the at least one concurrent point comprises a means for determining bits of the digital data associated with the concurrent point based on the values of some of the bits of the reference digital data and on the determined rank.

The features and advantages of the present invention will be discussed in detail in the following non-limiting description of specific embodiments in connection with the accompanying drawings.

BRIEF DESCRIPTION OF THE DRAWINGS

FIGS. 3A to 3F, similar to FIGS. 2A to 2F, illustrate an example of determination of a concurrent point for a first determined bit;

FIGS. 2A to 4F, similar to FIGS. 2A to 2F, illustrate an example of the determination of a concurrent point for a second determined bit; and FIGS. 5A to 5G each show the distribution of the values of one of the nbits bits of the digital data associated with the points of an example of a Q128 constellation.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

One embodiment of the present invention consists of using the symmetry properties inherent to the labeling of the constellations usually used for the quadrature amplitude modulation coding, to rapidly determine the concurrent points $P_{conc}^j$ based on a determined reference point Pref in the hard demapping step and associated with a received signal, for the calculation of ratios LLRj upon decoding of the signal.

An embodiment of the present invention will be described in detail in the case of a Gray constellation for which, for each non-peripheral point of the constellation, the digital data associated with said point comprises a single bit having a different value with respect to the digital data associated with the four points of the constellation closest to the considered point (that is, with respect to the points located North, South, East, and West of the considered point). The use of a Gray constellation generally improves the robustness against noise of a coding process. The number of coded bits associated with a point of a Gray constellation is necessarily even.

Figure 1:
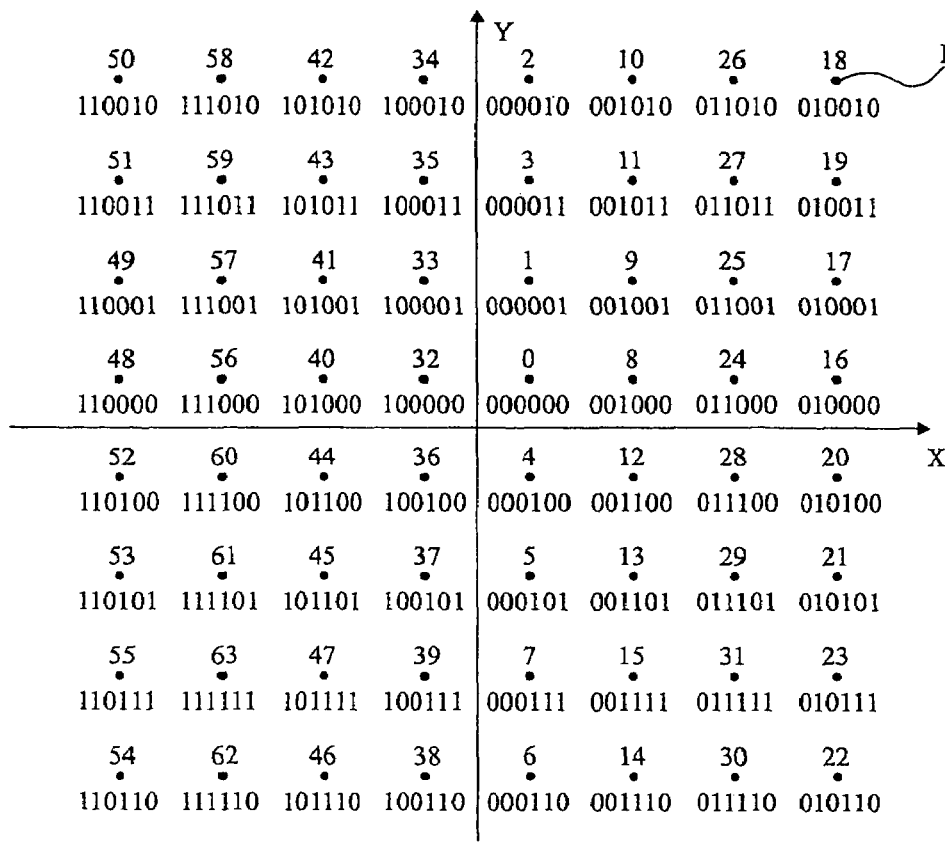
FIG. 1 shows an example of a QAM 64 constellation.
Figure 2A:
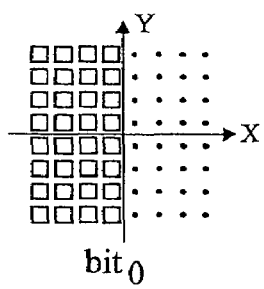
FIGS. 2A to 2F each show the distribution of the values of one of the nbits bits of the digital data associated with the points of the constellation of FIG. 1.
Figure 2B:
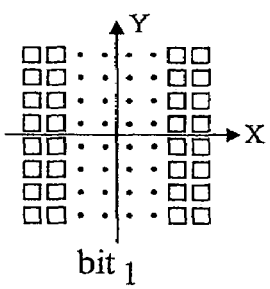
Figure 2C:
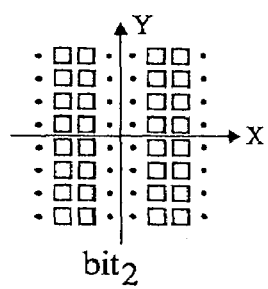
Figure 2D:
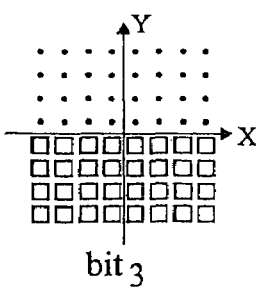
Figure 2E:
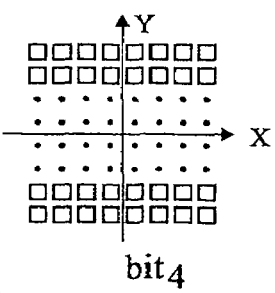
Figure 2F:
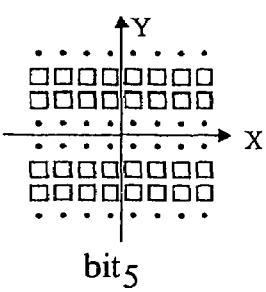

FIG. 1 shows in an orthonormal referential of axes (X,Y) an example of a Gray constellation with 64 states (nstates=64) thus enabling coding of digital data of 6 bits (nbits=6). Points P of the constellation are distributed over 8 lines and 8 columns. For each constellation point, the associated label has been indicated above said point, and the digital data of nbits thus labeled has been indicated under said point.

FIGS. 2A to 2F each show, in referential (X,Y), the distribution of values 1 and 0 of one of the bits, bit0 to bit5, of the digital data associated with the points of the Gray constellation of FIG. 1. Squares represent logic values 1 and points represent logic values 0. References bit0 and bit5 respectively correspond to the most significant bit and to the least significant bit. The selected mapping of digital data and of points of the Gray constellation of FIG. 1 is such that the three most significant bits bit0, bit1, bit2 of the digital data may be associated with components I of the constellation points and the three least significant bits bit3, bit4, bit5 may be associated with components Q. The three most significant bits bit0, bit1, bit2 of a digital data item are called the bits of component I and the three least significant bits bit3, bit4, bit5 are called the bits of component Q.

FIGS. 2A to 2F underline the specific symmetries of the Gray constellation of FIG. 1. For example, for FIG. 2A associated with the most significant bit bit0, logic values 1 are distributed on the lefthand portion of the constellation and logic values 0 are distributed on the right-hand side of the constellation. For FIG. 2B associated with bit bit1 which follows the most significant bit, logic values 0 are distributed on the four central columns and logic values 1 are distributed on the two remaining left-hand columns and the two remaining right-hand columns.

One embodiment of the present invention uses the symmetry properties of FIGS. 2A to 2F to rapidly and simply determine, based on a reference point Pref, the concurrent point $P_{conc}^j$ associated with each bit of the reference data. The method according to the present invention will be described in detail for the Gray constellation of FIG. 1 and will be generalized to other constellation types.

As an example, it is considered that to a received point Prec corresponds reference point Pref having label 41 and with which is associated reference data 101001. In FIGS. 3A to 3F and 4A to 4F, the position of reference point Pref is represented by a cross 10.

FIGS. 3A to 3F reproduce FIGS. 2A to 2F while illustrating the method for determining the concurrent point $P_{conc}^0$ associated with bit bit0, that is, the most significant bit of the component I of the reference data. In the present example, bit bit0 is equal to 1. Determining concurrent point $P_{conc}^0$ consists, in the present example, of determining the constellation point for which the associated digital data comprises a bit of rank 0 equal to 0 and which is closest to reference point Pref. Concurrent point $P_{conc}^0$ is easily identified from FIG. 3A and its position is indicated by a circle 12. More generally, there appears that, whatever the value of bit bit0 of the reference data, the corresponding concurrent point $P_{conc}^0$ will be necessarily located on one of the two central columns delimited, in FIG. 3A by a rectangle in dotted lines 14.

Concurrent point $P_{conc}^0$ is represented by a circle 12 on FIGS. 3B to 3F. This enables directly obtaining the values of the other bits of the digital data associated with concurrent point $P_{conc}^0$ or concurrent data. The other bits bit1, bit2 of component I of concurrent point $P_{conc}^0$ are thus equal to 0. The values of bits bit3, bit4, bit5 of component Q of concurrent point $P_{conc}^0$ are identical to those of component Q of reference point Pref.

FIGS. 4A to 4F illustrate the determination of concurrent point $P_{conc}^4$ associated with bit bit4 of the reference data. In the present example, bit bit4 is equal to 0. The bit of rank 4 of the concurrent data is thus equal to 1. In FIG. 4E, two rectangles 16 in dotted lines indicate the possible positions of concurrent point $P_{conc}^4$ whatever the position of reference point Pref. The position of reference point Pref is represented by a cross 18 and the position of concurrent point $P_{conc}^4$ is represented by a circle 20. Transferring rectangles 16 in dotted lines onto FIGS. 4A to 4D and 4F and using the symmetries of the Gray constellation, it can be deduced that the value of bit bit3 of component Q of point $P_{conc}^4$ is identical to that of bit bit3 of component Q of reference point Pref. Least significant bit bit5 of the concurrent data is equal to 1. The values of bits bit0, bit1, bit2 of component I of concurrent point $P_{conc}^4$ are equal to bits bit0, bit1, bit2 of component I of reference point Pref.

The present example enables formulating the following general rules for the determination of bit values of the binary data associated with concurrent point $P_{conc}^j$ corresponding to bit bitj based on a reference data item for a Gray constellation having any even number of bits and for which the bit value distribution figures are similar to FIGS. 2A to 2F.

1) Bit bitj is a bit of component I of concurrent point $P_{conc}^j$:
  bit bitj is opposite to bit bitj of the reference data;
  all the bits of component Q of concurrent point $P_{conc}^j$ are equal to the bits of component Q of reference point Pref;
  if bit bitj is the most significant bit of component I of concurrent point $P_{conc}^j$ the other bits of component I are equal to 0;
  if bit bitj is not the most significant bit of component I of concurrent point $P_{conc}^j$, the bits of component I of concurrent point $P_{conc}^j$ from the most significant bit of component I to the bit preceding bit bitj are equal to the corresponding bits of component I of reference point Pref, the bit of component I of concurrent point $P_{conc}^j$ following bit bitj is equal to 1, and the other bits of component I of concurrent point $P_{conc}^j$ are equal to 0.

2) Bit bitj is a bit of component Q of concurrent point $P_{conc}^j$; bit bitj is opposite to bit bid of the reference data;

all the bits of component I of concurrent point $P_{conc}^j$ are equal to the bits of component I of reference point Pref;

if bit bitj is the most significant bit of component Q of concurrent point $P_{conc}^j$, the other bits of component Q are equal to 0;

if bit bitj is not the most significant bit of component Q of concurrent point $P_{conc}^j$, then the bits of component Q of concurrent point $P_{conc}^j$ ranging from the most significant bit of component Q to the bit preceding bit bitj are equal to the corresponding bits of component Q of reference point Pref, the bit of component Q of concurrent point $P_{conc}^j$ following bit bitj is equal to 1, and the other bits of component Q of concurrent point $P_{conc}^j$ are thus equal to 0.

From the concurrent digital data, components $I_{conc}^j$ and $Q_{conc}^j$ may be immediately determined and used for the calculation of ratio LLRj, for example, based on the mapping function used for the transmission or based on a table where are stored for each digital data item the components of the associated constellation point.

The described example of the present invention thus enables, for each bit of the reference data, simple determination of the associated concurrent points without requiring any distance calculation. The present method does not require access to the components of the constellation points. It can thus easily be implemented by a dedicated circuit.

There appears that for any Gray constellation type, it is possible to formulate rules to determine concurrent points $P_{conc}^j$ which are similar to the preceding rules and the precise expression of which depends on the constellation type.

Another possibility consists of transforming any Gray constellation into a constellation for which the previously expressed rules are directly applicable. Indeed, a specific property of Gray constellations is that, whatever the way in which the mapping of the digital data and of the constellation points has been performed, it is always possible to transform the constellation into a constellation similar to that of FIG. 1 by performing, for each digital data item associated with a constellation point, one or several permutations between bits of determined ranks, and/or one or several inversions of the value of bits of determined ranks. This amounts to performing a permutation of FIGS. 2A to 2F or an inversion of the logic values represented on one of FIGS. 2A to 2F or several ones of them.

The described embodiments of the present invention may be implemented for constellations other than Gray-type constellations. It may apply, for example, to a quasi-Gray constellation for which the number of bits nbits is odd. In a quasi-Gray constellation, some specific points have at least one neighboring point with an associated digital data item having more than one bit of different value. FIGS. 5A to 5G represent figures similar to FIGS. 2A to 2G for an example of a QAM128 quasi-Gray constellation. It can be dearly seen from FIGS. 5A to 5G that the quasi-Gray constellation can be divided into sub-areas exhibiting the same symmetry properties as the QAM64 Gray constellation. Rules for the calculation of concurrent points $P_{conc}^j$ analogous to the previously expressed rules can thus easily be expressed by separating different cases according to the position of the reference point. In certain cases, for quasi-Gray constellations, the concurrent point calculation rules provide two possible concurrent points. To resolve such ambiguities, the distances between the possible concurrent points and received point Prec may then be calculated. The concurrent point kept is that for which the calculated distance is minimum.

Generally, it can be shown that any quasi-Gray constellation can be turned into a specific quasi-Gray constellation for which the distribution of the bit values of the digital data associated with the constellation points have symmetry properties analogous to those of FIGS. 5A to 5G.

Similarly, the embodiments of the present invention may be applied to any constellation type for which the bit value distributions of the constellation exhibit remarkable symmetry properties. Further, the embodiments of the present invention may be applied to any constellation which, by a set of permutations and/or inversions of the digital data bits associated with the constellation points, may be turned into a constellation having remarkable symmetry properties.

The described embodiments of the present invention may be utilized in a variety of different types of electronic systems, such as wireless networks, modems, or digital video broadcasting systems, and may be implemented through hardware circuits in an integrated circuit or through software, or a combination of both.

Of course, the present invention is likely to have various alterations, modifications, and improvements which will readily occur to those skilled in the art. In particular, the previously-described decoding steps may be carried out with other decoding operations when the transmitted signal has further been coded according to specific coding techniques. Further, error correction operations may also be performed in parallel with the previously-described decoding steps. Further, the embodiments of the present invention have been described in the context of a constellation used by a phase quadrature modulation. It should be dear that the present invention may apply to any type of modulation implementing a constellation.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for decoding a noisy signal provided from the coordinates of a point in a constellation of points, each constellation point being associated with a digital data item of a determined number of bits, comprising the steps of:

determining, based on the noisy signal, components of a received point;

determining a reference point associated with a digital reference data item and corresponding to the point in the constellation of points closest to the received point;

determining at least one concurrent point corresponding to the point in the constellation of points closest to the reference point associated with a digital data item, having a bit of determined rank with a logic value opposite to the bit of determined rank of the reference data; and determining, at least for the bit of the reference digital data at said determined rank, a precision data item based on the received point, the reference point, and the concurrent point, wherein the determination of the bits of the digital data associated with the concurrent point is performed based on the values of some of the bits of the reference digital data and on said rank.

2. The method of claim 1, wherein the points in the constellation of points for which the bits of the digital data associated with the determined rank have a determined logic value are distributed in at least one set of juxtaposed points symmetrical with respect to one or the other of two reference axes.

3. The method of claim 1, wherein for successive ranks, the points in the constellation of points for which the bits of the digital data associated with said successive ranks have a determined logic value are distributed in at least one set of juxtaposed points symmetrical with respect to a same reference axis of the constellation.

4. The method of claim 1, wherein the constellation is a Gray constellation.

5. The method of claim 1, wherein the constellation is a quasi-Gray constellation.

6. The method of claim 1, wherein the noisy signal is provided by a quadrature amplitude modulation.

7. A decoding device comprising:
a means for receiving a noisy signal provided from the coordinates of a point of a constellation of points, each point in the constellation being associated with a digital data item of a determined number of bits;
a means for determining based on the noisy signal components of a received point;
a means for determining a reference point associated with a reference digital data item and corresponding to the point in the constellation of points closest to the received point;
a means for determining at least one concurrent point corresponding to the point in the constellation of points closest to the reference point associated with a digital data item, having a bit at a determined rank with a logic value opposite to the bit at the same determined rank of the reference data; and
a means for determining, at least for the bit of the reference digital data at the determined rank, a precision data item based on the received point, on the reference point, and on the concurrent point
wherein the means for determining the at least one concurrent point comprises a means for determining bits of the digital data associated with the concurrent point based on the values of some of the bits of the reference digital data and on the determined rank.

8. A method for decoding a received point to a corresponding point in a constellation of points, the received point and each point in the constellation having a number of bits, the method comprising:
determining a reference point corresponding to the point in the constellation that is nearest the received point;
determining at least one concurrent point corresponding to the point in the constellation of points nearest the reference point having a selected bit that is the complement of the corresponding bit of the reference point, with the bits of the concurrent point being determined as a function of the bits in the reference point and a rank associated with the selected bit; and
determining a decoded point corresponding to the decoded received point, the decoded point being determined as a function of the received point, the reference point, and the concurrent point.

9. The method of claim 8 wherein the point in the constellation of points comprises a Gray or quasi-Gray constellation.

10. The method of claim 8 wherein the received point corresponds to a point derived from a received quadrature amplitude modulated signal.

11. A method for decoding a received point in a modulation technique including a constellation of points, the method comprising:
determining a reference point in the constellation of points; and
determining at least one concurrent point without performing any distance; calculations; and
determining a decoded point as a function of the received point, reference point, and concurrent point.

12. The method of claim 11 wherein determining at least one concurrent point without performing any distance calculations comprises determining at least one concurrent point corresponding to a point in the constellation that is nearest the reference point and that has a selected bit that is the complement of the corresponding bit of the reference point, with the bits of the concurrent point being determined as a function of the bits in the reference point and a position of the selected bit.

13. The method of claim 11 wherein the point constellation comprises a Gray or quasi-Gray constellation.

14. The method of claim 11 wherein the modulation technique comprises quadrature amplitude modulation.

15. A decoding device, comprising:
a receiver adapted to receive a modulated signal and operable to generate a received data word from the modulated signal, the received data word having a number of bits;
a reference data word generator coupled to the receiver and operable to generate a reference data word derived from the received data word and a constellation of points;
a concurrent data word generator coupled to the reference data word generator and operable to generate at least one concurrent data word point as a function of the bits in the reference data word and a position of a selected bit in the reference data word; and
a decoded word generator coupled to the receiver, reference data word generator, and concurrent data word generator, the decoded word generator operable to generate a decoded word as a function of the received data word, the reference data word, and the concurrent data word.

16. The decoding device of claim 15 wherein the decoding device is formed within an integrated circuit.

17. The decoding device of claim 16 wherein the integrated circuit comprises a modem.

18. An electronic system, comprising:
a decoding device including,
a receiver adapted to receive a modulated signal and operable to generate a received data word from the modulated signal, the received data word having a number of bits;
a reference data word generator coupled to the receiver and operable to generate a reference data word derived from the received data word and a constellation of points;
a concurrent data word generator coupled to the reference data word generator and operable to generate at least one concurrent data word point as a function of the bits in the reference data word and a position of a selected bit in the reference data word; and a decoded word generator coupled to the receiver, reference data word generator, and concurrent data word generator, the decoded word generator operable to generate a decoded word as a function of the received data word, the reference data word, and the concurrent data word.

19. The electronic system of claim 18 wherein the electronic system comprises a computer system.

20. The electronic system of claim 19 wherein the decoding device is formed within an integrated circuit.

* * * * *